UNITED STATES PATENT OFFICE.

OSCAR REICHENBACH, OF NORRISTOWN, PENNSYLVANIA.

IMPROVEMENT IN PREPARING COTTON-SEED FOR EXTRACTING OIL.

Specification forming part of Letters Patent No. 13,708, dated October 23, 1855.

*To all whom it may concern:*

Be it known that I, OSCAR REICHENBACH, of Norristown, in the county of Montgomery and State of Pennsylvania, have invented a new and Improved Mode of Extracting Oil from Cotton-Seed; and I hereby declare that the following is a full and exact description of the said invention.

The cotton-seed when it comes out of the cotton-gin is still wrapped in a quantity of fiber firmly attached to it. This fiber forms the principal obstacle to an easy and profitable extraction of oil. In a reservoir of suitable material one pours a quantity of sulphuric acid, (oil of vitriol,) and in this one throws and presses so much cotton-seed as will go into the acid, about five pounds of acid to one bushel of seed. The acid soon destroys the cotton fiber, and a new quantity of seed can be added and mixed with the former. When the acid is so absorbed that it would not destroy the fiber of any more seed, or, rather, moisten it, one pours water into the mixture, opens a cock at the bottom of the reservoir and lets the liquid run off from the seed. Fresh water is poured in the same way over the seed till all acidity is gone. One finds the fiber destroyed, the kernel with its peel remaining. If the acid were to stay too long, it would destroy the peel first and then part of the inner grain. The success of the operation is produced by the circumstance that the acid destroys the fiber before and in less time than the peel. So one must begin with washing the grain immediately one finds the fiber or part of the peel carbonized. It facilitates the process if one takes acid and seed after having raised their temperature to about 140° Fahrenheit. The seed is now dried to be fit for the common and usual operation of stamping, pressing, &c. The whole process is reduced to the usual one for extraction of oil from seeds.

If one wants to obtain oil almost without color, one can separate on a peeling-mill the peel from the grain, for it is the peel which gives to the oil its red color.

The acidulated water may be used for preparing different manures or utilized for the fabrication of vitriol or sulphuric acid. I obtained six pounds of oil from a basket of cotton-seed as it comes from the cotton-gin; but in wholesale fabrication, where many losses I experienced will be avoided, I presume it to yield between seven and eight pounds at least.

What I claim as my invention, and desire to secure by Letters Patent, is—

The application of sulphuric acid or acids in general to free cotton-seed, as it comes from the cotton-gin, from all surrounding cotton fiber previous to the extraction of oil from the seed.

OSCAR REICHENBACH.

Witnesses:
NATH. JACOBY,
JOHN J. CAUFFMAN.